United States Patent
Yoshino et al.

(10) Patent No.: US 11,120,143 B2
(45) Date of Patent: Sep. 14, 2021

(54) DATA ANALYSIS SERVER, DATA ANALYSIS SYSTEM, AND DATA ANALYSIS METHOD

(71) Applicant: Hitachi, Ltd., Tokyo (JP)

(72) Inventors: Masayuki Yoshino, Tokyo (JP); Hisayoshi Sato, Tokyo (JP); Ken Naganuma, Tokyo (JP); Takayuki Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 365 days.

(21) Appl. No.: 16/379,457

(22) Filed: Apr. 9, 2019

(65) Prior Publication Data

US 2019/0318104 A1 Oct. 17, 2019

(30) Foreign Application Priority Data

Apr. 11, 2018 (JP) .............................. JP2018-076363

(51) Int. Cl.
*G06F 21/60* (2013.01)
*G06N 5/04* (2006.01)
*G06N 20/00* (2019.01)
*H04L 9/08* (2006.01)

(52) U.S. Cl.
CPC ........... *G06F 21/602* (2013.01); *G06N 5/045* (2013.01); *G06N 20/00* (2019.01); *H04L 9/0894* (2013.01)

(58) Field of Classification Search
CPC ...... G06F 21/602; G06N 20/00; G06N 5/045; H04L 9/0894
See application file for complete search history.

(56) References Cited

U.S. PATENT DOCUMENTS

| 10,102,399 B2* | 10/2018 | Veugen ................ H04L 9/008 |
| 10,491,373 B2* | 11/2019 | Jain .................... H04L 9/008 |
| 2003/0176931 A1* | 9/2003 | Pednault .............. G06N 20/00 700/31 |

(Continued)

OTHER PUBLICATIONS

Hastie, T. et al. "The Element of Statistical Learning", Springer Series in Statics, Springer New York Inc., 2001, pp. 305-316, 587-604 (31 pages).

(Continued)

*Primary Examiner* — Dereena T Cattungal
(74) *Attorney, Agent, or Firm* — Procopio, Cory, Hargreaves & Savitch LLP

(57) ABSTRACT

A data analysis server holds base-point-added information, wherein the base-point-added information includes a value of an explanatory variable encrypted by first high-performance encryption, a value of a response variable encrypted by a predetermined encryption scheme, and a base point based on frequencies of the value of the explanatory variable in information for learning are associated with one another, wherein the data analysis server: executes decision tree generation processing for generating a decision tree having a leaf node associated with the value of the response variable encrypted by the predetermined encryption scheme, which is included in the base-point-added information; and execute branching rule determine processing in decision tree generation processing without decrypting the value of the explanatory variable and the base point corresponding.

9 Claims, 16 Drawing Sheets

(56) References Cited

U.S. PATENT DOCUMENTS

| | | | | |
|---|---|---|---|---|
| 2012/0201378 | A1* | 8/2012 | Nabeel | H04L 9/008 |
| | | | | 380/255 |
| 2016/0156595 | A1* | 6/2016 | Wu | H04L 9/008 |
| | | | | 713/168 |
| 2018/0046927 | A1* | 2/2018 | Tokunaga | G06F 16/00 |
| 2018/0359084 | A1* | 12/2018 | Jain | G06F 7/483 |
| 2020/0204341 | A1* | 6/2020 | Williams | G06N 5/003 |

OTHER PUBLICATIONS

Wu, D. et al. "Privately Evaluating Decision Trees and Random Forests" Proceedings on Privacy Enhancing Technologies, 2016(4): 335-355 (21 pages).

* cited by examiner

|  | EXPLANATORY VARIABLE | | RESPONSE VARIABLE |
|---|---|---|---|
| 0TH ROW | GENDER (ATTRIBUTE 1) | CANCER (ATTRIBUTE 2) | COMPLICATION (ATTRIBUTE 3) |
| 1ST ROW | MALE | ESOPHAGUS | ORAL CAVITY |
| 2ND ROW | FEMALE | LARGE INTESTINE | SMALL INTESTINE |
|  | FEMALE | LARGE INTESTINE | SMALL INTESTINE |
|  | . | . | . |
|  | . | . | . |
|  | MALE | SKIN | - |
| mTH ROW | FEMALE | BLADDER | OVARY |

EXPLANATORY VARIABLE: E(GENDER), E(CANCER)
RESPONSE VARIABLE: E(COMPLICATION)

253

| E(GENDER) | E(CANCER) | E(COMPLICATION) | E(BASE POINT) | PARENT NODE NUMBER | CHILD NODE NUMBER |
|---|---|---|---|---|---|
| E(MALE) | E(ESOPHAGUS) | E(ORAL CAVITY) | E(100) | 1 | - |
| E(FEMALE) | E(ESOPHAGUS) | E(ORAL CAVITY) | E(100) | 1 | - |
| E(MALE) | E(LARGE INTESTINE) | E(SMALL INTESTINE) | E(60) | 1 | - |
| E(FEMALE) | E(LARGE INTESTINE) | E(SMALL INTESTINE) | E(60) | 1 | - |
| E(MALE) | E(SKIN) | E(-) | E(40) | 1 | - |
| E(FEMALE) | E(SKIN) | E(-) | E(20) | 1 | - |
| E(MALE) | E(BLADDER) | E(-) | E(10) | 1 | - |
| E(FEMALE) | E(BLADDER) | E(OVARY) | E(5) | 1 | - |

ASSIGNED TO CHILD NODE NUMBER

253

| E(GENDER) | E(CANCER) | E(COMPLICATION) | E(BASE POINT) | PARENT NODE NUMBER | CHILD NODE NUMBER |
|---|---|---|---|---|---|
| E(MALE) | E(ESOPHAGUS) | E(ORAL CAVITY) | E(100) | 1 | 2 |
| E(FEMALE) | E(ESOPHAGUS) | E(ORAL CAVITY) | E(100) | 1 | 3 |
| E(MALE) | E(LARGE INTESTINE) | E(SMALL INTESTINE) | E(60) | 1 | 2 |
| E(FEMALE) | E(LARGE INTESTINE) | E(SMALL INTESTINE) | E(60) | 1 | 3 |
| E(MALE) | E(SKIN) | E(-) | E(40) | 1 | 2 |
| E(FEMALE) | E(SKIN) | E(-) | E(20) | 1 | 3 |
| E(MALE) | E(BLADDER) | E(-) | E(10) | 1 | 2 |
| E(FEMALE) | E(BLADDER) | E(OVARY) | E(5) | 1 | 3 |

UPDATE PARENT NODE NUMBER AND CHILD NODE NUMBER

253

| E(GENDER) | E(CANCER) | E(COMPLICATION) | E(BASE POINT) | PARENT NODE NUMBER | CHILD NODE NUMBER |
|---|---|---|---|---|---|
| E(MALE) | E(ESOPHAGUS) | E(ORAL CAVITY) | E(100) | 2 | - |
| E(FEMALE) | E(ESOPHAGUS) | E(ORAL CAVITY) | E(100) | 3 | - |
| E(MALE) | E(LARGE INTESTINE) | E(SMALL INTESTINE) | E(60) | 2 | - |
| E(FEMALE) | E(LARGE INTESTINE) | E(SMALL INTESTINE) | E(60) | 3 | - |
| E(MALE) | E(SKIN) | E(-) | E(40) | 2 | - |
| E(FEMALE) | E(SKIN) | E(-) | E(20) | 3 | - |
| E(MALE) | E(BLADDER) | E(-) | E(10) | 2 | - |
| E(FEMALE) | E(BLADDER) | E(OVARY) | E(5) | 3 | - |

FIG. 11

|  | PARENT NODE NUMBER | BRANCHING ATTRIBUTE | BRANCHING CONDITION | CHILD NODE NUMBER |
|---|---|---|---|---|
| 1ST ROW | 1 | E(GENDER) | E(MALE), E(FEMALE) | 2, 3 |
| 2ND ROW | 2 | E(CANCER) | E(ESOPHAGUS) or E(LARGE INTESTINE), E(SKIN) or E(BLADDER) | 4, 5 |
| ⋮ | 3 | E(CANCER) | E(ESOPHAGUS) or E(BLADDER), E(SKIN) or E(LARGE INTESTINE) | 6, 7 |
| | 4 | E(CANCER) | E(ESOPHAGUS), E(LARGE INTESTINE) | 8, 9 |
| | 5 | E(CANCER) | E(SKIN), E(BLADDER) | 10, 11 |
| | 6 | E(CANCER) | E(ESOPHAGUS), E(BLADDER) | 12, 13 |
| | 7 | E(CANCER) | E(LARGE INTESTINE), E(SKIN) | 14, 15 |
| | 8 | - | - | - |
| | 9 | - | - | - |
| | 10 | - | - | - |
| | 11 | - | - | - |
| | 12 | - | - | - |
| | 13 | - | - | - |
| | 14 | - | - | - |
| | 15 | - | - | - |

*FIG. 12B*

| LEAF NODE NUMBER | E(COMPLICATION) (RESPONSE VARIABLE) |
|---|---|
| 8 | E(ORAL CAVITY) |
| 9 | E(ORAL CAVITY) |
| 10 | E(SMALL INTESTINE) |
| 11 | E(SMALL INTESTINE) |
| 12 | E(-) |
| 13 | E(-) |
| 14 | E(-) |
| 15 | E(OVARY) |

336

| cs3bc (ATTRIBUTE 1) | ac3fc (ATTRIBUTE 2) | 357fc2 (ATTRIBUTE 3) | lk2sj1 (BASE POINT) | CHECK EXTRACTION |
|---|---|---|---|---|
| a8e3c | 974fe | 19fc3 | fa42d | True |
| b42f1 | 974fe | 26cd7 | abce4 | False |
| a8e3c | 26fab | 214b3 | 12f9a | False |
| b42f1 | 26fab | 876af | ab5c4 | False |
| a8e3c | 16f32 | abc11 | f018a | False |
| b42f1 | 16f32 | 7813f | abc26 | True |
| a8e3c | 80e42 | 78fff | 425fa | True |
| b42f1 | 80e42 | 7745f | a4bc3 | False |

DATA ANALYSIS SERVER, DATA ANALYSIS SYSTEM, AND DATA ANALYSIS METHOD

CLAIM OF PRIORITY

The present application claims priority from Japanese patent application JP 2018-076363 filed on Apr. 11, 2018, the content of which is hereby incorporated by reference into this application.

BACKGROUND OF THE INVENTION

The present invention relates to a data analysis server, a data analysis system, and a data analysis method.

In recent years, for the purpose of efficient data analysis, instead of maintaining an information system by an own organization, it has been attracting attention to use a data analysis agent service to request data analysis from an information system provided by another organization. In addition, a decision tree analysis which is a kind of data analysis method, and a random forest which has been extended from the decision tree analysis, are widely used. Examples of the decision tree analysis and the random forest are described in Trevor Hastie, Robert Tibshirani, and Jerome Friedman, "The Element of Statistical Learning", Springer Series in Statics, Springer New York Inc., 2001, pp. 305-316 and pp. 587-604.

When such a data analysis agent service as described above is used, data content leaks to an external organization serving as an agent for the analysis. In view of this, in David J. Wu, Tony Feng, Michael Naehrig, and Kristin Lauter, "Privately Evaluating Decision Trees and Random Forests" PETS Symposium in the United States, 2016 (hereinafter referred to simply as "Privately Evaluating Decision Trees and Random Forests"), there is described a technology for performing a random forest analysis safely by applying an encryption technology to data containing privacy information or other such sensitive information. Specifically, in "Privately Evaluating Decision Trees and Random Forests", there is described a method involving classifying the random forest analysis into a learning phase and an analysis phase and preventing data content from leaking in the analysis phase.

SUMMARY OF THE INVENTION

However, for example, there is a possibility that data for learning contains sensitive information, which requires secrecy of the data to be improved even in a learning phase of a decision tree analysis. Therefore, one embodiment of this invention has an object to improve secrecy of data in a learning phase of a decision tree analysis.

In order to solve the above problems, an aspect of the present invention adopts the following constructions. A data analysis server, includes: a processor; and a memory, wherein the memory is configured to hold base-point-added information generated from information for learning, wherein the base-point-added information includes a plurality of records, in each of which a value of an explanatory variable encrypted by first high-performance encryption, a value of a response variable encrypted by a predetermined encryption scheme, and a base point based on a number of occurrences of the value of the explanatory variable in the information for learning are associated with one another, wherein the base point held in the base-point-added information is encrypted by second high-performance encryption, wherein the processor is configured to: execute decision tree generation processing for generating a decision tree having a leaf node associated with the value of the response variable encrypted by the predetermined encryption scheme, which is included in the base-point-added information; and decide, in the decision tree generation processing, a branching rule based on the value of the explanatory variable in the decision tree, and wherein the processor is configured to, in the decision of the branching rule: generate at least one branching rule candidate; and execute, without decrypting the value of the explanatory variable for the at least one branching rule candidate and the base point corresponding to the value of the explanatory variable: processing for summing up, by referring to the base-point-added information for each of the at least one branching rule candidate, the base point corresponding to the value of the explanatory variable for the each of the at least one branching rule candidate in the base-point-added information; processing for calculating, for each of the at least one branching rule candidate, the evaluation point for the each of the at least one branching rule candidate based on the summed base point and a predetermined evaluation function; and processing for deciding the branching rule to be employed from the at least one branching rule candidate based on the calculated evaluation point. An aspect of the present invention can improve secrecy of data in a learning phase of a decision tree analysis.

Problems, constructions, and effects which are not above-mentioned are explained in the following embodiments.

BRIEF DESCRIPTIONS OF DRAWINGS

The present invention can be appreciated by the description which follows in conjunction with the following figures, wherein:

FIG. 5 is an example of the table for learning according to the first embodiment;

FIG. 11 is an explanatory diagram for illustrating an example of an outline of the decision tree generation processing according to the first embodiment;

FIG. 12B is an example of a decision tree table according to the first embodiment;

DETAILED DESCRIPTION OF THE PREFERRED EMBODIMENTS

Figure 1:
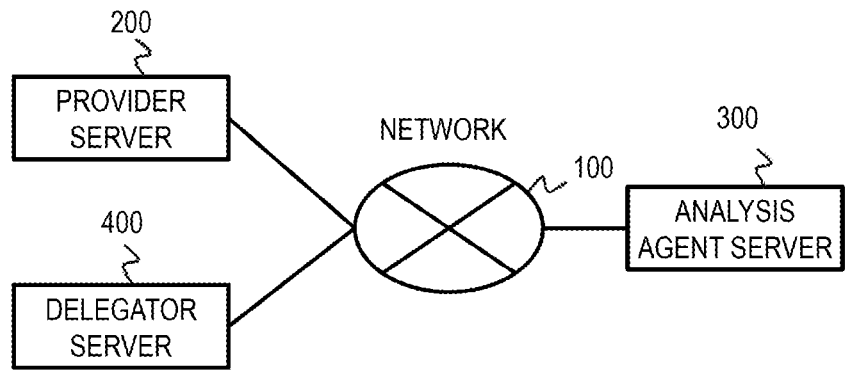
FIG. 1 is a block diagram for illustrating a configuration example of a data analysis system according to the first embodiment.

Hereinafter, embodiments are described with reference to the accompanying drawings. Elements common to the drawings are denoted by the same reference signs in the embodiments. It should be noted that the embodiments are merely examples to implement the present invention and are not to limit the technical scope of this disclosure.

First, terms and symbols used in the embodiments are defined as follows.

(1) Table

A table is a kind of data structure. In this embodiment, data handled in a tabular format is referred to as "table". Each of sets of data obtained by dividing the table into units of rows (in a horizontal axis direction) is referred to as "record", and one element in the table is referred to as "cell". Each cell has data input thereto. Meanwhile, the table is divided into units of columns (in a vertical axis direction), and each of the columns indicates an attribute. For example, "name", "gender", "age", and other such item are used as attributes in the table. Values that can be input are defined for the respective attributes, and a set of those values is referred to as "plaintext space". When the attribute is "gender", (male and female) is a plaintext space. When the attribute is "cancer", for example, "esophagus", "large intestine", "skin", and "bladder" are included in a plaintext space. When the attribute is "age", a set of integers from 0 to about 100 is an example of a plaintext space.

The embodiments are described by taking an example in which information used by a data analysis system described later is a table, but the information may be expressed by any data structure without depending on the data structure. For example, in addition to a table, a data structure appropriately selected from a group including a list, a database, and a queue may store the information.

The table is described by taking a table for learning as an example. FIG. 5 is an example of the table for learning. Attributes of patients at a given hospital are described in respective cells in a record in the zeroth row of the table for learning. The attribute in the first column is the gender of a patient, and the plaintext space of the gender is formed of "male" and "female". Therefore, the value of each cell in the first column is any one of "male" and "female". An occurrence location of a cancer in the patient is described as the attribute in the second column, and the value of each cell in the second column has any one of the values included in the plaintext space (esophagus, large intestine, skin, and bladder). As the attribute in the third column, a body part of a cancer by which the patient tends to be complicated is written.

(2) Encryption and Decryption

In the embodiments, data that is not encrypted is referred to as "plaintext data". Encryption refers to receiving an encryption key and plaintext data as input and outputting encrypted data obtained by converting the plaintext data. In the embodiments, the encrypted data is represented by E( ) For example, 0 and 1 are encrypted to obtain pieces of encrypted data E(0) and E(1), respectively. Meanwhile, decryption refers to receiving a decryption key and encrypted data as input and outputting plaintext data inversely converted from the encrypted data.

(3) Standard Encryption

Standard encryption refers to an encryption scheme having encryption and decryption functions.

(4) Searchable Encryption

Searchable encryption refers to an encryption scheme having not only the encryption and decryption functions but also a determination function of determining equality between pieces of data that have been encrypted in a searchable manner without decrypting the data. The determination function receives two pieces of encrypted data as input, and performs the determination based on values of the respective pieces of plaintext data before being encrypted. For example, when E(0) and E(1) are input, a search function of the searchable encryption outputs a symbol meaning that the values are different from each other (0=!1). In contrast, when E(0) and E(0) are input, the search function outputs a symbol meaning that the values are the same (0=0). The searchable encryption is an example of high-performance encryption and functional encryption.

(5) Summable and Comparable Encryption

Summable and comparable encryption refers to an encryption scheme having not only the encryption and decryption functions but also a summation function of performing summation without performing decryption and a comparison function of comparing magnitudes of values of summed pieces of encrypted data without decrypting the data. The comparison function receives two pieces of encrypted data as input, and outputs a result of determining their magnitude relationship based on their values. For example, when E(0) and E(1) are input, the comparison function outputs a symbol indicating that one of the values is larger (0<1). Meanwhile, when E(0) and E(0) are input, the comparison function outputs a symbol indicating that the values are the same (0=0). In addition, the comparison function can compare E(0+1), which is obtained by summing E(0) and E(1), and E(1+1), which is obtained by summing E(1) and E(1), to thereby determine E(0+1)<E(1+1). As the summable and comparable encryption, there are known fully homomorphic encryption that can achieve any arithmetic operation in an encrypted state, secret calculation to be performed via a network, and other such means. The summable and comparable encryption is an example of high-performance encryption and functional encryption.

(6) Decision Tree and Decision Tree Analysis

A decision tree analysis refers to a kind of machine learning that aims at, for example, prediction and discrimination. In general, in the decision tree analysis, a learning model called "decision tree" is built in a learning phase using a table for learning, and in an analysis phase, the decision tree is used to perform discrimination and prediction on a table for analysis. Variables (records) of the table for learning are associated with a root node, which is located at the highest level of the decision tree, and internal nodes other than the root node, and values relating to discrimination and prediction results are associated with a leaf node, which is located at the lowest level.

Figure 6:
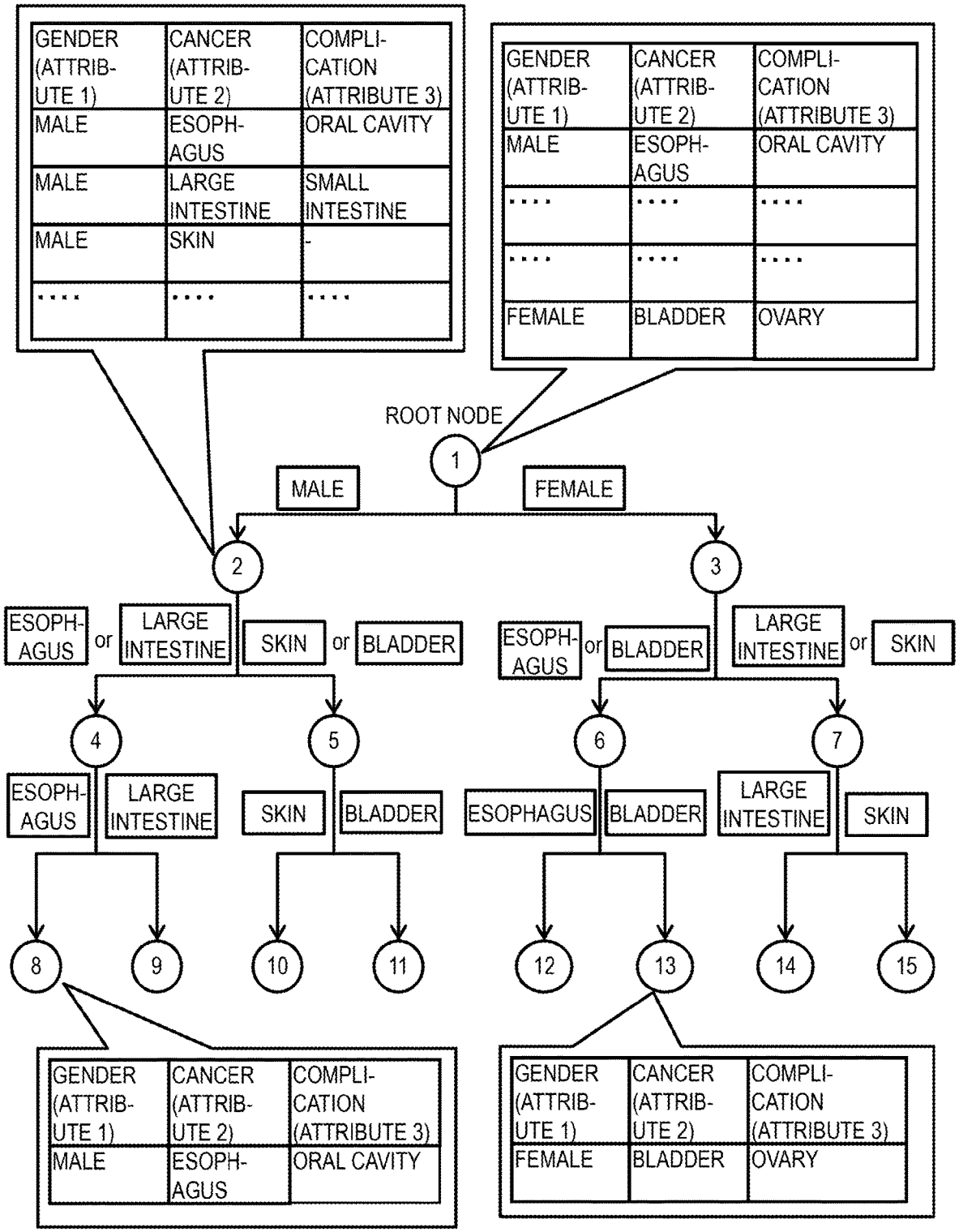
FIG. 6 is an explanatory diagram for illustrating an example of a decision tree according to the first embodiment.

FIG. 6 is an explanatory diagram for illustrating an example of a decision tree obtained when a value of an attribute 3 is predicted through use of values of an attribute 1 and an attribute 2 in the table for learning of FIG. 5. The root node is associated with a table 222 for learning, and has the number "1" assigned as its node number. When branches that branch off from the root node are set for the attribute 1 (gender) in the table 222 for learning, the table 222 for learning is subjected to sorting based on whether the gender is "male" or "female". In other words, the number "2" is assigned to a node that branches off based on "male", and the node is associated with only records having "male" as the attribute 1 (gender). In the same manner, the number "3" is assigned to a node that branches off based on "female", and the node is associated with only records having "female" as the attribute 1 (gender).

The node "2" and the node "3" each branch off downward into branches extending to reach leaf nodes at the lowest level in terms of the attribute 2 (cancer). The leaf nodes are each associated with the table 222 for learning that satisfies a condition as a result relating to classification and prediction. For example, when a leaf node "8" is reached as a result of a decision tree analysis, an oral cavity cancer of the attribute 3 is obtained as an analysis result thereof.

In the decision tree analysis, after a decision tree is built, an analysis phase for performing discrimination and classification on a table for analysis is performed. In the analysis phase, a path from the root node to the leaf node is followed based on the branching of the decision tree to output a result relating to the classification and prediction associated with the leaf node.

(7) Random Forest Analysis

A random forest analysis refers to a kind of decision tree analysis. In the random forest analysis, a large number of decision trees are created by repeatedly performing random data extraction from the table for learning in a learning phase, and in an analysis phase, results of the decision tree analysis based on a large number of decision trees are summed up to create final classification and prediction results. When the results are summed up, a determination method based on majority decision, an average value, a median value, or other such value of the plurality of results is used.

First Embodiment

FIG. 1 is a block diagram for illustrating a configuration example of a data analysis system according to a first embodiment of this invention. The data analysis system includes, for example, a provider server 200, an analysis agent server 300, and a delegator server 400. For example, the provider server 200 and the analysis agent server 300 can transmit and receive data to/from each other through a network 100. The delegator server 400 and the analysis agent server 300 can also transmit and receive data to/from each other through the network 100.

The provider server 200 encrypts a table for learning for creating a decision tree, and provides the table for learning to the analysis agent server 300. The delegator server 400 encrypts data for analysis, and transmits the data for analysis to the analysis agent server 300 to delegate the analysis to the analysis agent server 300. The analysis agent server 300 generates a decision tree from the encrypted table for learning, and uses the decision tree to analyze the data for analysis.

Figure 2:
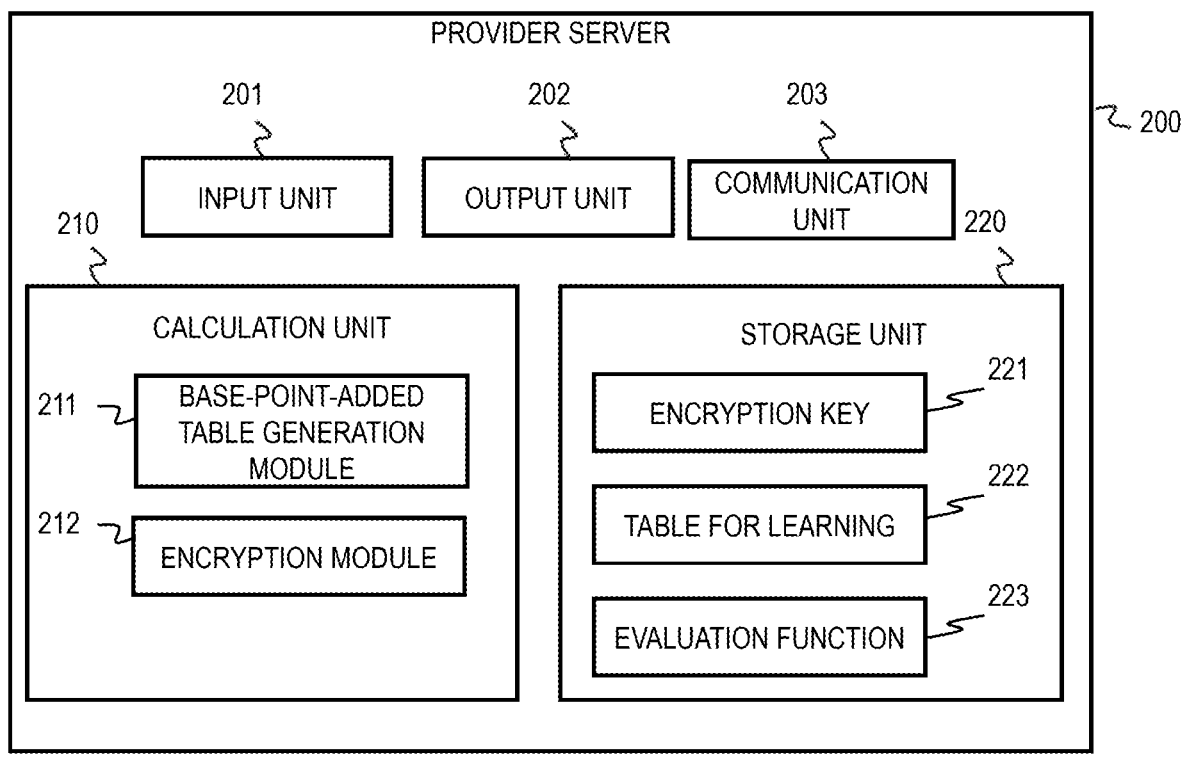
FIG. 2 is a block diagram for illustrating a configuration example of a provider server according to the first embodiment.

FIG. 2 is a block diagram for illustrating a configuration example of the provider server 200 in the first embodiment. The provider server 200 includes, for example, an input unit 201, an output unit 202, a communication unit 203, a calculation unit 210, and a storage unit 220. The input unit 201 is, for example, an interface, which is coupled to a keyboard, a mouse, or other such peripheral apparatus, and is configured to receive input from an operator.

The output unit 202 is, for example, an interface which is coupled to a display, a printer, or other such peripheral apparatus, and is configured to output an execution result obtained by a program in a format that is visually recognizable by the operator. The communication unit 203 is a network interface apparatus configured to control communication to/from another apparatus through the network 100 in accordance with a predetermined protocol.

The calculation unit 210 includes a processor, and executes a program stored in the storage unit 220. The storage unit 220 includes a memory and an auxiliary storage apparatus. The memory includes a ROM, which is a nonvolatile memory device, and a RAM, which is a volatile memory device. The ROM stores, for example, an invariant program (for example, BIOS). The RAM is a dynamic random access memory (DRAM) or other such high-speed volatile memory device, and temporarily stores a program to be executed by the processor and data to be used at a time of execution of the program.

The auxiliary storage apparatus is, for example, a magnetic storage apparatus (HDD), a flash memory (SSD), or other such large-capacity nonvolatile storage apparatus, and stores the program to be executed by the processor included in the calculation unit 210 and the data to be used at the time of the execution of the program. In other words, the program is read from the auxiliary storage apparatus, and loaded into the memory to be executed by the processor.

The program to be executed by the calculation unit 210 is provided to the provider server 200 through intermediation of a removable medium (CD-ROM or flash memory) or through the network 100, and is stored in a nonvolatile auxiliary storage apparatus being a non-transitory storage medium. Therefore, the provider server 200 may include an interface configured to read data from the removable medium. The same applies to the analysis agent server 300 and the delegator server 400.

The provider server 200 is a computer system formed on physically one computer or formed on a plurality of computers that are configured logically or physically, and may be operated on separate threads on the same computer, or may operate on a virtual machine built on a plurality of physical computer resources. The same applies to the analysis agent server 300 and the delegator server 400.

The calculation unit 210 includes, for example, a base-point-added table generation module 211 and an encryption module 212. For example, the calculation unit 210 operates in accordance with a base-point-added table generation program loaded into the storage unit 220, to thereby function as the base-point-added table generation module 211. The calculation unit 210 also operates in accordance with an encryption program loaded into the storage unit 220, to thereby function as the encryption module 212. The same applies to respective units and modules included in calculation units of the analysis agent server 300 and the delegator server 400. The storage unit 220 stores an encryption key 221, the table 222 for learning, and an evaluation function 223.

The base-point-added table generation module 211 uses the table 222 for learning and the evaluation function 223 to generate a base-point-added table. The encryption module 212 uses the encryption key 221 to encrypt an area defined in the table 222 for learning by standard encryption or summable and comparable encryption, to thereby encrypt the base-point-added table.

The encryption key 221 is an encryption key for encrypting a value in the table 222 for learning. The table 222 for learning stores a table for learning to be used by the analysis agent server 300 generating a decision tree. The evaluation function 223 is a function for calculating a base point from the table for learning.

Figure 3:
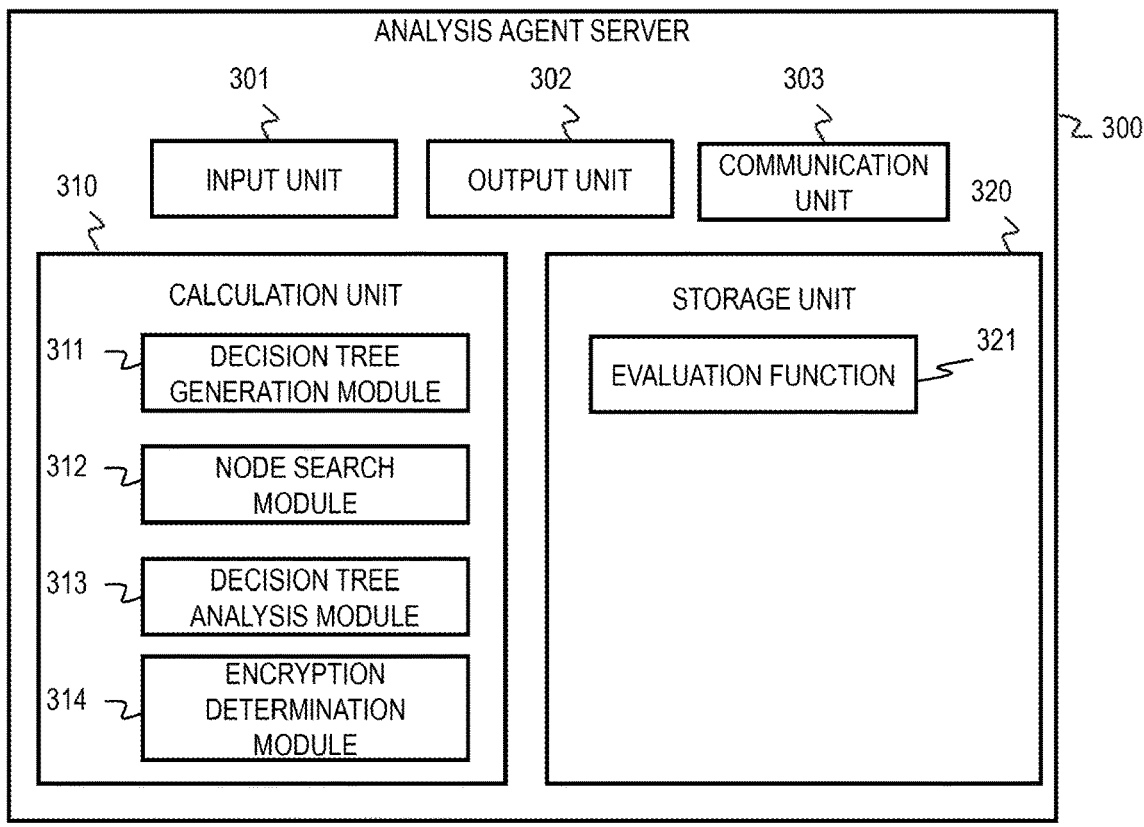
FIG. 3 is a block diagram for illustrating a configuration example of an analysis agent server according to the first embodiment.

FIG. 3 is a block diagram for illustrating a configuration example of the analysis agent server 300 in the first embodiment. The analysis agent server 300 includes, for example, an input unit 301, an output unit 302, a communication unit 303, a calculation unit 310, and a storage unit 320. Descriptions of the input unit 301, the output unit 302, the communication unit 303, the calculation unit 310, and the storage unit 320 are the same as the descriptions of the input unit 201, the output unit 202, the communication unit 203, the calculation unit 210, and the storage unit 220, respectively, and are therefore omitted.

The calculation unit 310 includes, for example, a decision tree generation module 311, a node search module 312, a decision tree analysis module 313, and an encryption determination module 314. The storage unit 320 stores, for example, an evaluation function 321. The decision tree generation module 311 uses the encrypted base-point-added table to generate a decision tree without decrypting the base-point-added table. The node search module 312 performs a node search when the decision tree generation module 311 generates a decision tree.

The decision tree analysis module 313 uses the decision tree generated by the decision tree generation module 311 and an encrypted table for analysis described later to analyze the table for analysis without decrypting the table for analysis. The encryption determination module 314 performs comparison and match determination on the table for analysis without decrypting the table for analysis. The evaluation function 321 is a function for calculating an evaluation point for the node search.

Figure 4:
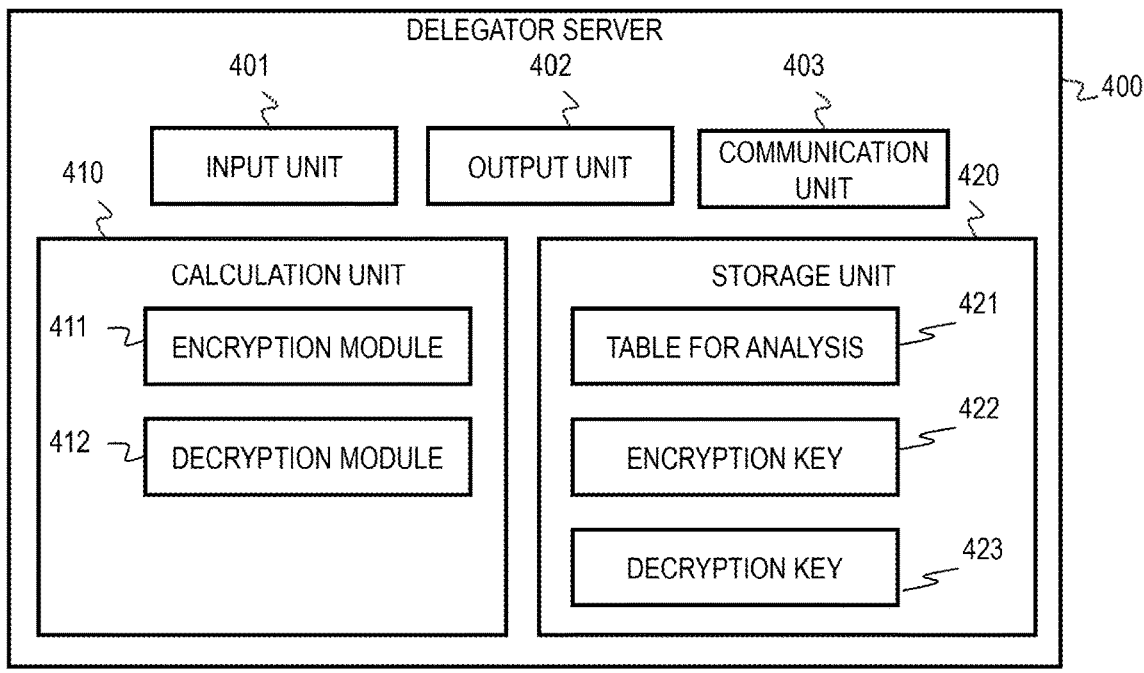
FIG. 4 is a block diagram for illustrating a configuration example of a delegator server according to the first embodiment.

FIG. 4 is a block diagram for illustrating a configuration example of the delegator server 400 in the first embodiment. The delegator server 400 includes, for example, an input unit 401, an output unit 402, a communication unit 403, a calculation unit 410, and a storage unit 420. Descriptions of the input unit 401, the output unit 402, the communication unit 403, the calculation unit 410, and the storage unit 420 are the same as the descriptions of the input unit 201, the output unit 202, the communication unit 203, the calculation unit 210, and the storage unit 220, respectively, and are therefore omitted.

The calculation unit 410 includes an encryption module 411 and a decryption module 412. The storage unit 420 stores a table 421 for analysis, an encryption key 422, and a decryption key 423. The encryption module 411 uses the encryption key 422 to encrypt an area defined in the table 222 for learning by standard encryption or summable and comparable encryption. The decryption module 412 decrypts the received analysis result.

The table 421 for analysis is data to be analyzed by the analysis agent server 300 through use of the decision tree. The encryption key 422 is an encryption key for encrypting a value in the table 421 for analysis. The decryption key 423 is a decryption key for decrypting the analysis result received from the analysis agent server 300.

The provider server 200 may perform a part or all of the functions of the delegator server 400, or the delegator server 400 may perform a part or all of the functions of the provider server 200.

Figure 7:
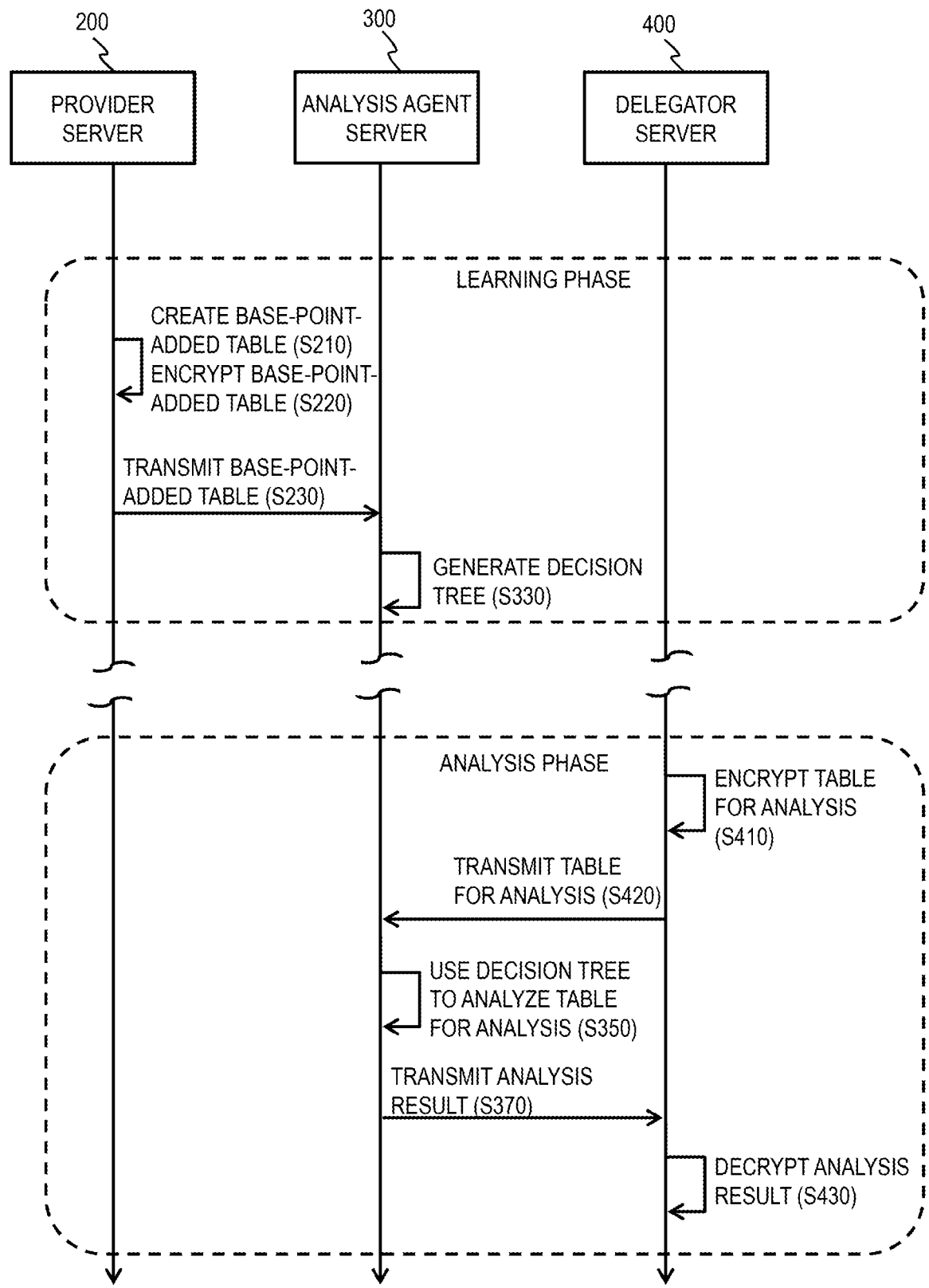
FIG. 7 is a sequence diagram for illustrating an example of processing performed by the data analysis system according to the first embodiment.

FIG. 7 is a sequence diagram for illustrating an example of processing performed by the data analysis system according to the first embodiment. Specifically, FIG. 7 is an illustration of an example of an outline of processing performed by each of the provider server 200, the analysis agent server 300, and the delegator server 400 and an example of an outline of data transmitted and received through the network 100.

The processing performed by the data analysis system includes a learning phase and an analysis phase. In the learning phase, the provider server 200 encrypts the table 222 for learning, and the analysis agent server 300 generates a decision tree from the encrypted table 222 for learning. In the analysis phase, the delegator server 400 encrypts a table for analysis, and the analysis agent server 300 uses the decision tree to analyze the encrypted table for analysis, and provides the analysis result to the delegator server 400.

First, the learning phase is described. The base-point-added table generation module 211 calculates a base point of the table 222 for learning, and generates a base-point-added table obtained by adding the calculated base point to the table 222 for learning (Step S210). Details of base-point-added table generation processing are described later. Subsequently, the encryption module 212 encrypts the base-point-added table (Step S220), and transmits the encrypted base-point-added table to the analysis agent server 300 (Step S230).

When the analysis agent server 300 receives the base-point-added table, the decision tree generation module 311, the decision tree analysis module 313, and the encryption determination module 314 create a decision tree from the received base-point-added table (Step S330). Details of decision tree creation processing are described later.

Next, a description is given of a sequence representing the analysis phase. The encryption module 411 encrypts the table 421 for analysis (Step S410), and transmits the encrypted table 421 for analysis to the analysis agent server 300 (Step S420). When the analysis agent server 300 receives the table for analysis, the decision tree analysis module 313 analyzes the table for analysis (Step S350), and transmits the analysis result to the delegator server 400 (Step S370). Details of the analysis processing are described later. When the received analysis result is encrypted, the delegator server 400 decrypts the analysis result (Step S430).

Figure 8:
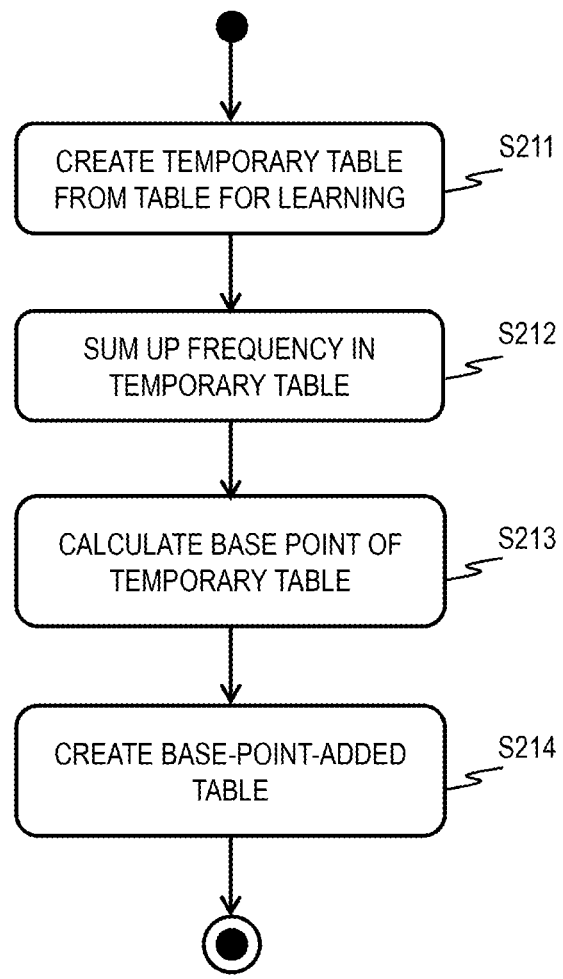
FIG. 8 is a flow chart for illustrating an example of base-point-added table generation processing according to the first embodiment.

FIG. 8 is a flow chart for illustrating an example of the base-point-added table generation processing performed in Step S210. The base-point-added table generation module 211 classifies attributes in the table 222 for learning as explanatory variables and response variables, and creates a temporary table from combinations of plaintext space values of respective attributes classified as the explanatory variables (Step S211). For example, which attribute is classified as the explanatory variable and which attribute is classified as the response variable may be defined in advance, or may be defined based on input of a user of the provider server 200.

Figure 9:
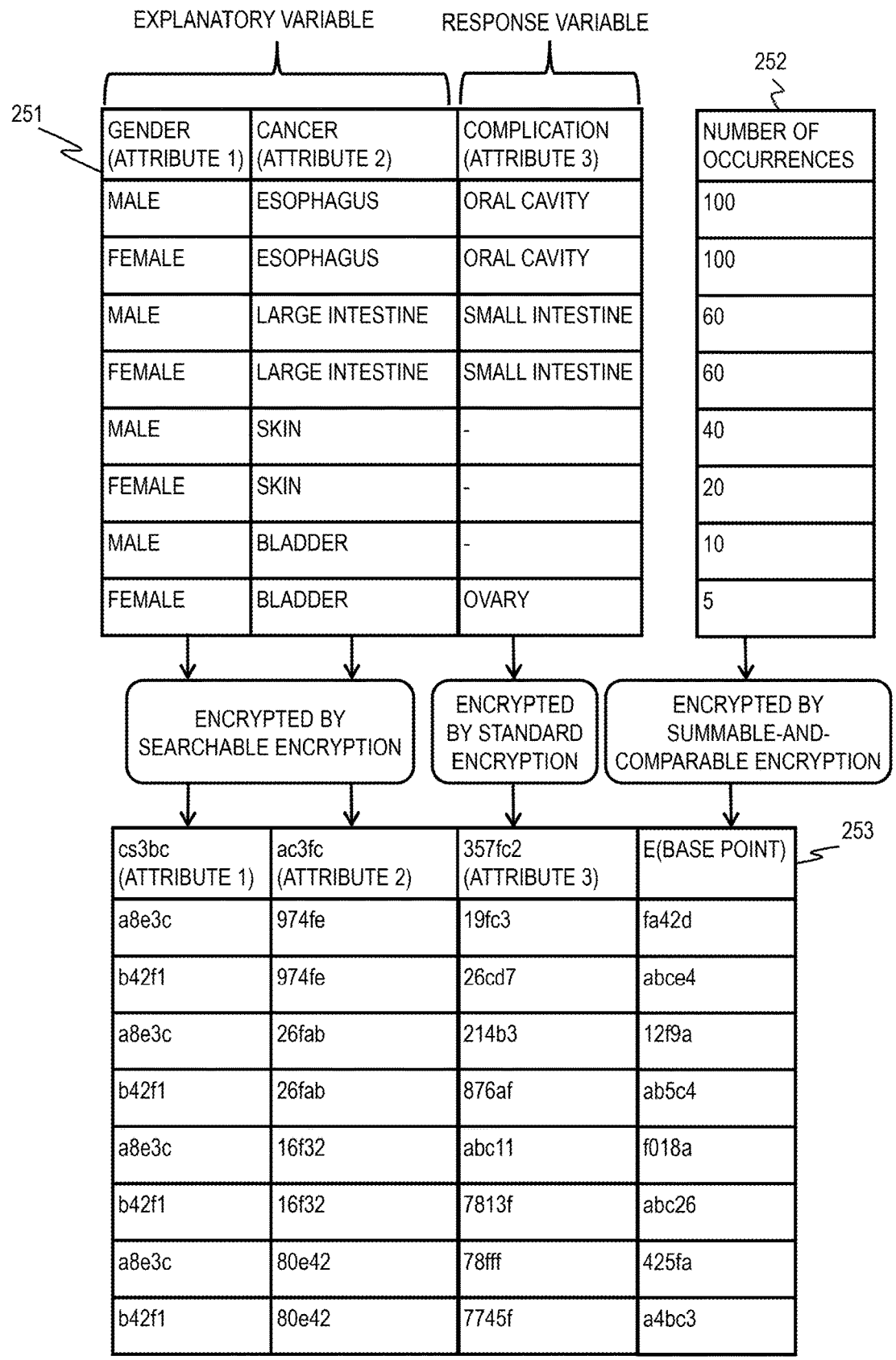
FIG. 9 is an explanatory diagram for illustrating an example of an outline of processing for creating a base-point-added table from the table for learning according to the first embodiment.

FIG. 9 is an explanatory diagram for illustrating an example of an outline of processing for creating a base-point-added table from the table 222 for learning. For example, when the table 222 for learning has three kinds of attributes (gender, cancer, and complication), in Step S211, the base-point-added table generation module 211 classifies "gender" and "cancer" as the explanatory variables and "complication" as the response variable.

In Step S211, the base-point-added table generation module 211 creates a temporary table 251 including, as its records, (male and esophagus), (female and esophagus), (male and large intestine), (female and large intestine), (male and skin), (female and skin), (male and bladder), and (female and bladder), each of which is a combination of plaintext space values of the respective explanatory variables. The base-point-added table generation module 211 also adds a response variable field to the temporary table 251.

The base-point-added table generation module 211 may generate a combination of plaintext space values including a value of an attribute that does not occur in the table 222 for learning. Specifically, in regard to a numerical attribute, for example, "age", even a value that does not occur in the table 222 for learning is handled as a plaintext space value as long as the value is included in a predetermined range (for example, "0" to "100" years old). Meanwhile, in regard to for example, a textual attribute (or numerical attribute indicating a nominal scale), for example, "gender", even when there is only a record for "male" in the table 222 for learning, both "male" and "female", which are values defined in advance, are handled as plaintext space values. This improves secrecy of the table 222 for learning.

In addition, the base-point-added table generation module 211 may aggregate plaintext space values. Specifically, in regard to a numerical attribute, for example, "age", the base-point-added table generation module 211 may aggregate values for each of predetermined ranges (for example, "0" to "9" years old, "10" to "19" years old, . . . , "90" to "99" years old, and "100" years old or older) to set a new value of the plaintext space. Meanwhile, in regard to a textual attribute (or numerical attribute indicating a nominal scale), for example, "complication" the base-point-added table generation module 211 may aggregate values for each of groups defined in advance (for example, "large intestine" and "small intestine" for group "1" and "esophagus" and "bladder" for group "2") to set a new value of the plaintext space. This reduces processing amounts for the learning phase and the analysis phase and a data amount of a decision tree described later.

The base-point-added table generation module 211 also extracts, for example, an attribute value exhibiting the largest number of occurrences among attribute values of the response variable which correspond in the table 222 for learning to each of combinations of values of the explanatory variables of the records in the temporary table 251. The base-point-added table generation module 211 stores each extracted attribute value in the response variable field of the temporary table 251 as the value of the response variable corresponding to the combination of the values of the explanatory variables in the temporary table 251.

In FIG. 9, for example, the attribute value exhibiting the largest number of occurrences among the values of the response variable which correspond in the table 222 for learning to the combination of the values (male and esophagus) of the explanatory variables is "oral cavity", and hence the value "oral cavity" is stored in the response variable field of the record for the combination of the values (male and esophagus) of the explanatory variables in the temporary table 251. Further, in FIG. 9, for example, there is no value of the response variable which corresponds in the table 222 for learning to the combination of the values (male and skin) of the explanatory variables, or there is no combination of the values (male and skin) of the explanatory variables in the table 222 for learning, and hence the value in the response variable field of the record for the combination of the values (male and esophagus) of the explanatory variables in the temporary table 251 is a blank value (for example, null value).

The base-point-added table generation module 211 may newly generate a value that is not contained in the table 222 for learning as the value of the response variable to be added to the temporary table 251. It is now assumed that "oral cavity" occurs 80 times and "small intestine" occurs 20 times as the values of the response variable which correspond in the table 222 for learning to the combination of the values (male and esophagus) of the explanatory variables. In this case, for example, the base-point-added table generation module 211 may generate a new value "oral cavity: 80%; small intestine: 20%" of the response variable, which indicates a ratio of complication, and store the value in the corresponding record in the temporary table 251.

Subsequently, the base-point-added table generation module 211 sums up the number of occurrences that the combination of the values of the explanatory variables of each of the records in the temporary table 251 occurs in the table 222 for learning (Step S212). For example, when the table 222 for learning contains 100 records having (male and esophagus) as the combination of plaintext space values, the number of occurrences of the record for (male and esophagus) in the temporary table 251 is evaluated as 100. The base-point-added table generation module 211 performs the same processing on each of the records in the temporary table 251, and generates a column 252 indicating the number of occurrences in the example of FIG. 9.

Subsequently, the base-point-added table generation module 211 calculates a base point based on the evaluation function 223 (Step S213). Examples of the evaluation function 223 include an error ratio, an information entropy, and a Gini coefficient. In the first embodiment, processing performed when the evaluation function 223 is an error ratio is described (the same processing is performed even when the evaluation function 223 is a Gini coefficient or an information entropy, and hence a description of such a case is omitted).

When the evaluation function 223 is an error ratio, the base-point-added table generation module 211 calculates the number of occurrences as the base point as it is, and generates a base-point-added table obtained by adding a column indicating the base point to the temporary table 251 (Step S214). The description is given, with reference to FIG. 9, of an example in which only one response variable is stored in each record in the base-point-added table (that is, a response variable is uniquely determined for each combination of the values of the explanatory variable), but a plurality of response variables may be stored in a record in the base-point-added table.

As described above, in Step S220, the encryption module 212 encrypts each cell of the base-point-added table. Specifically, for example, the encryption module 212 encrypts a base point field by summable and comparable encryption, encrypts explanatory variable fields by searchable encryption, and encrypts the response variable field by standard encryption. The response variable field may be encrypted by encryption other than the standard encryption (for example, by searchable encryption or summable and comparable encryption), but it is desired to employ the standard encryption, which is an encryption scheme exhibiting a small processing amount of encryption processing and decryption processing and a high security level. The base-point-added table is encrypted, to thereby generate an encrypted base-point-added table 253.

Figure 10:
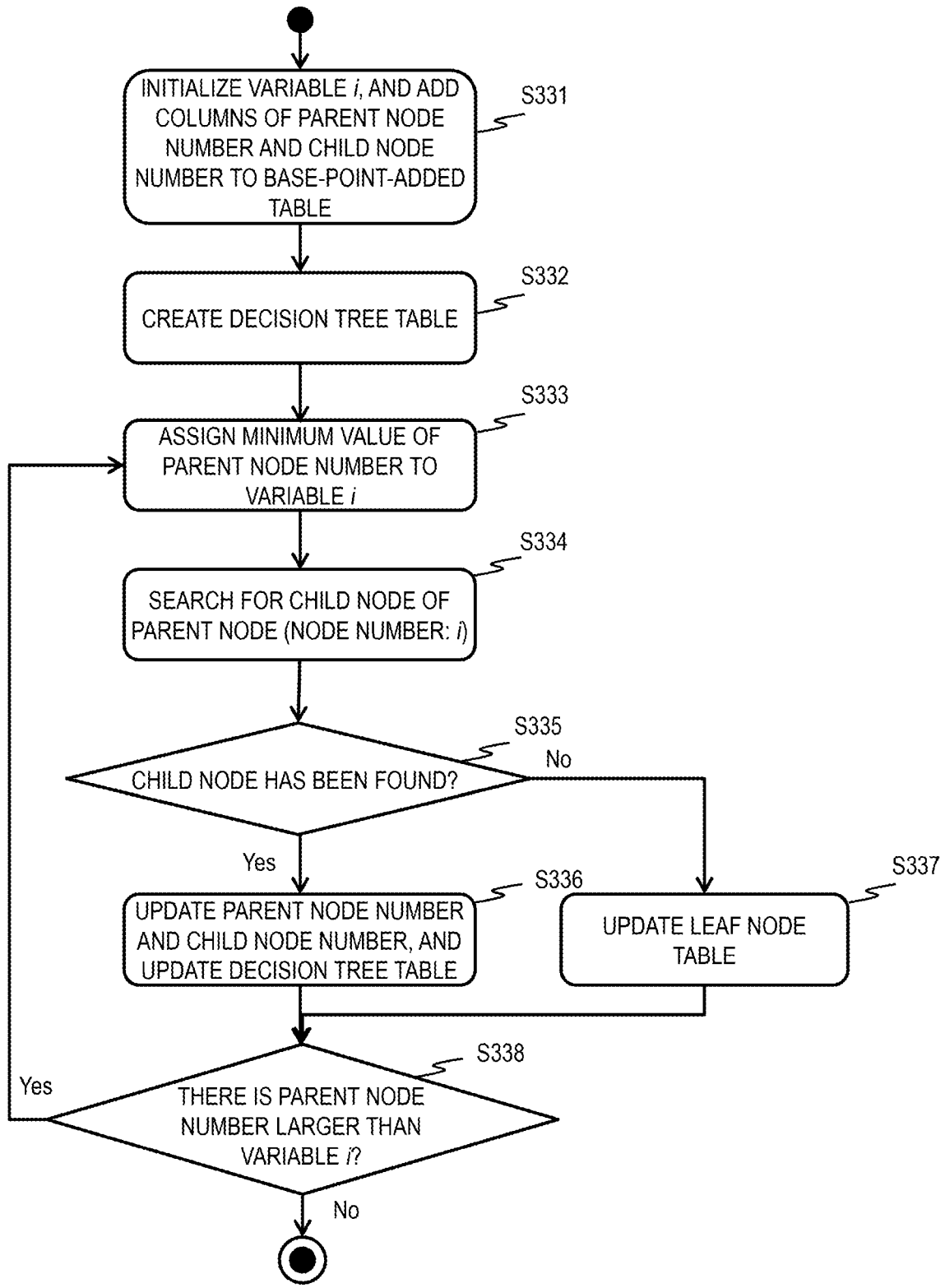
FIG. 10 is a flow chart for illustrating an example of decision tree generation processing performed according to the first embodiment.
Figure 12A:
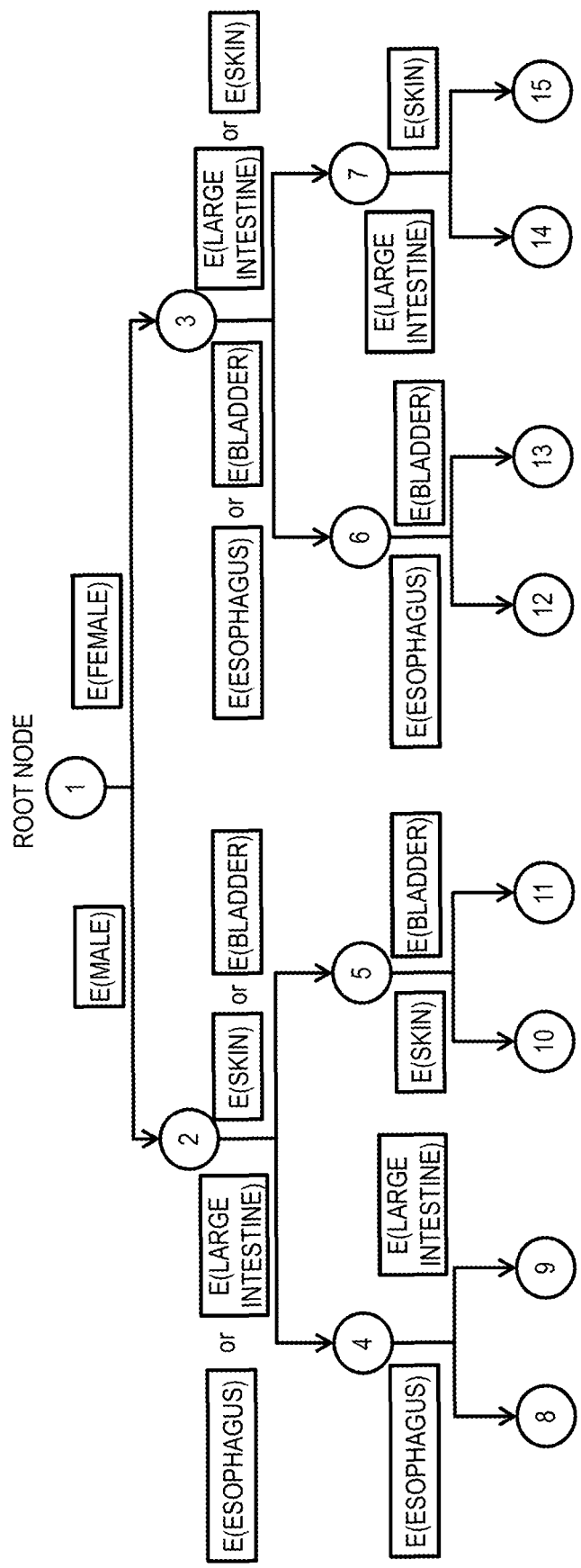
FIG. 12A is an example of a decision tree according to the first embodiment.

FIG. 10 is a flow chart for illustrating an example of decision tree generation processing performed in Step S330. FIG. 11 is an explanatory diagram for illustrating an example of an outline of the decision tree generation processing. FIG. 12A is an example of the decision tree. FIG. 12B is an example of a decision tree table representing the decision tree illustrated in FIG. 12A. FIG. 16B is an example of a leaf node table.

In the decision tree generation processing, the decision tree generation module 311 proceeds downward from the root node, which is the node located at the highest level, while sequentially searching for a branch that outputs the most satisfactory value through use of the evaluation function 321, to thereby generate a decision tree.

First, the decision tree generation module 311 initializes the variable i to 0, and adds a column for managing a parent node number and a column for managing a child node number (hereinafter referred to as "parent node management column" and "child node management column", respectively) to the base-point-added table 253 (Step S331). However, the initial value of the number of the parent node management column is set to 1 (number of the root node), and the initial value of the number of the child node management column is set to "–" (no value) (see the base-point-added table 253 shown in the upper part of FIG. 11).

Subsequently, the decision tree generation module 311 generates a decision tree table having no value stored in each cell (Step S332). The decision tree table is a table having four columns (parent node number, branching attribute, branching condition, and child node number). The first row of the decision tree table indicates a root node, and 1 is stored in a parent node number field in the first row as shown in FIG. 12B. The decision tree generation module 311 sets the minimum value of the parent node number for the variable i (Step S333).

Subsequently, the decision tree generation module 311 searches for a child node from the parent node of the variable i (Step S334). Details of child node search processing are described later. The decision tree generation module 311 determines whether or not the child node has been found (Step S335). The decision tree generation module 311 advances to Step S336 when a child node has been found (Yes in Step S335), and advances to Step S337 when a child node has not been found (No in Step S335).

The decision tree generation module 311 enters a child node number of the found child node in the child node number field of the decision tree table (Step S336). In the first embodiment, in order to describe an example of generating a binary tree, the child node numbers are set to two times i (2i) and a value obtained by adding one to the doubled value (2i+1). The base-point-added table 253 shown in the middle part of FIG. 11 indicates that an attribute for deciding how to branch off from the parent node (root node) (hereinafter also referred to as "branching attribute") is "gender". The base-point-added table 253 further indicates that the parent node branches off to the child node of the node number 2 when the "gender" is "male", and the parent node branches off to the child node of the node number 3 when the "gender" is "female". The attribute value for deciding a node of a branching destination in the branching attribute is also referred to as "branching condition".

Then, in Step S336, the decision tree generation module 311 overwrites the parent node number field with the value in the child node number field of the base-point-added table 253, and changes the child node number to a blank value (for example, null value) (see the base-point-added table 253 shown in the lower part of FIG. 11). In Step S336, the decision tree generation module 311 also stores, in the decision tree table, the branching attribute in a branching attribute field corresponding to the parent node number, the branching conditions in a branching condition field corresponding to the parent node number, and the child node numbers of the found child nodes in the child node number field. In addition, the child node numbers are each registered in the parent node number.

In the example of FIG. 12B, the first row of the decision tree table indicates that the branching attribute for the parent node of the node number 1 (root node) is E(gender), the branching conditions are E(male) and E(female), and the child nodes of branching destinations are the child node of the node number 2 and the child node of the node number 3. Each of the values in the branching condition field and each of the values in the child node number field that are located at the same order position correspond to each other. Specifically, the first row of the decision tree table shown in FIG. 12B indicates that the branching destination is the child node of the node number 2 when the attribute value is E(male), while the branching destination is the child node of the node number 3 when the attribute value is E(female).

Referring back to the description of FIG. 10, when a child node has not been found (No in Step S335), the decision tree generation module 311 updates a leaf node table 336 (Step S337). Specifically, the decision tree generation module 311 registers i as a leaf node number, and registers the corresponding response variable in the base-point-added table 253 as the analysis result.

In the example of FIG. 16B, the leaf node table 336 includes a leaf node number field and a response variable field. Subsequently, the decision tree generation module 311 determines whether or not there is a parent node number larger than i in the parent node management column (Step S338). When determining that there is a parent node number larger than i (Yes in Step S338), the decision tree generation module 311 returns to Step S333. When determining that there is no parent node number larger than i (No in Step S338), the decision tree generation module 311 brings the decision tree generation processing to an end.

The decision tree illustrated in FIG. 12A is described. In the decision tree illustrated in FIG. 12A, branches extend from the root node (number 1) as binary trees through the internal nodes (number 2, number 3, . . . , and number 7) to reach the leaf nodes (number 8, number 9, . . . , and number 15). The branching conditions are written on the branches (the branching attributes are desired to be written as well, but are omitted for the sake of space), for example, the branching condition for causing the root node to branch off to the internal node of the number 2 is that the branching attribute matches E(gender) and the value matches E(male). In the same manner, the branching condition for branching off to the internal node of the number 3 is that the branching attribute matches E(gender) and the value matches E(female).

Figure 13:
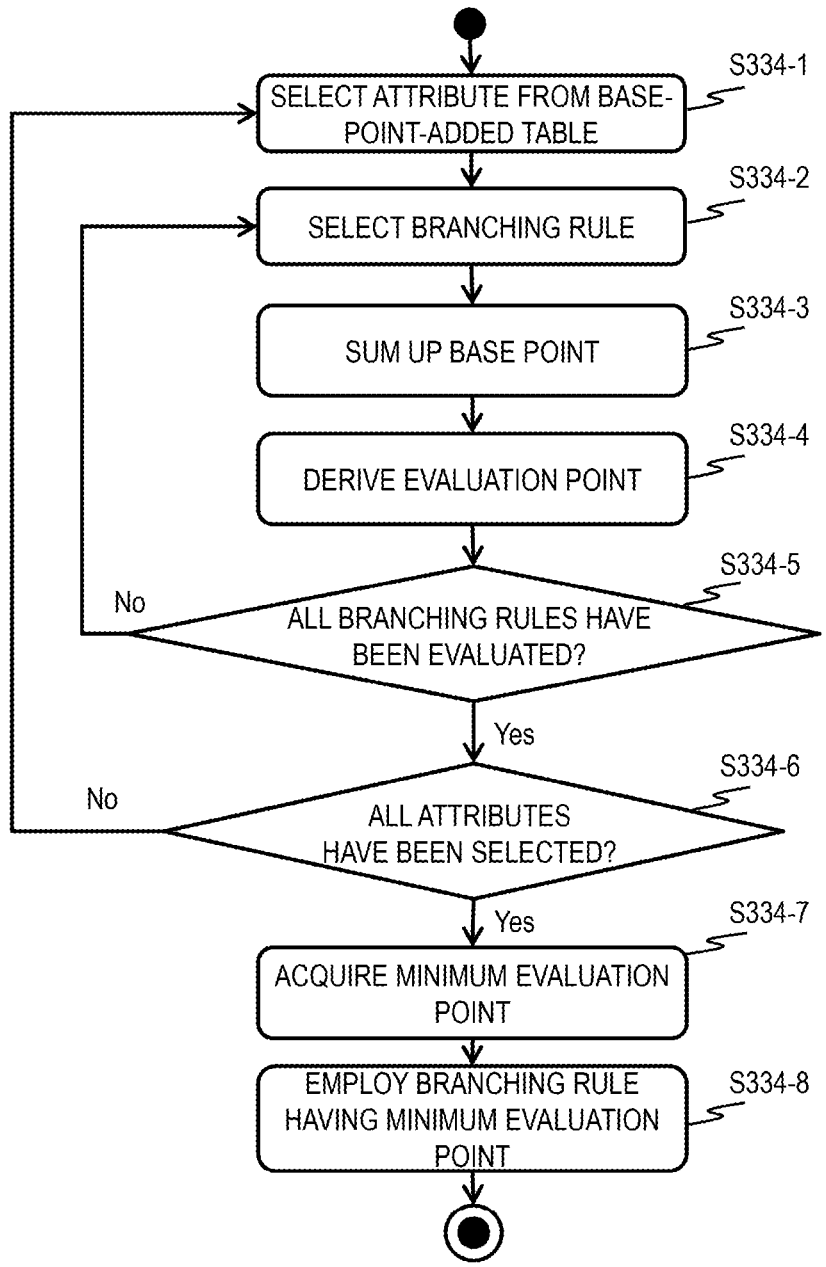
FIG. 13 is a flow chart for illustrating an example of node search processing performed according to the first embodiment.

FIG. 13 is a flow chart for illustrating an example of node search processing performed in Step S334. The node search module 312 selects one of the attributes from the encrypted base-point-added table 253 (Step S334-1). In the example of FIG. 9 and other figures, the node search module 312 selects, for example, E(gender) or E(cancer) from the encrypted base-point-added table 253.

Subsequently, the node search module 312 searches branching rules of the encrypted data for the selected attribute to select one of the branching rules (Step S334-2). For example, when the node search module 312 selects the branching by the attribute E(gender), there are only two kinds of points E(male) and E(female) in the plaintext space for the attribute E(gender), and hence there is only one branching rule for branching off to any one of E(male) and E(female). Therefore, in this case, the node search module 312 selects the one branching rule in Step S334-2.

Meanwhile, for example, when the node search module 312 selects the attribute E(cancer), there are four kinds of points E(esophagus), E(large intestine), E(skin), and E(bladder) in the plaintext space for the attribute E(cancer). Therefore, in this case, there are three kinds of branching rules including a branching rule for branching off to any one of E(esophagus) or E(large intestine) and E(skin) or E(bladder), a branching rule for branching off to any one of E(esophagus) or E(skin) and E(large intestine) or E(bladder), and a branching rule for branching off to any one of E(esophagus) or E(bladder) and E(large intestine) or E(skin). In Step S334-2, the node search module 312 selects one unselected branching rule from among those branching rules, for example, at random.

In the above-mentioned example, when the number of plaintext space values is 2n (where n is a natural number equal to or larger than 1), a branching rule for branching off to any one of a set of n values among the 2n values and a set of the other n values is the branching rule to be selected, but those sets may not be defined in units of n values. Specifically, in the above-mentioned example in which there are four kinds of values E(esophagus), E(large intestine), E(skin), and E(bladder) as the plaintext space values for the attribute E(cancer), there may be, for example, a branching rule for branching off to any one of E(esophagus) or E(large intestine) or E(skin) and E(bladder).

In the same manner, when the number of plaintext space values is 2n+1 (where n is a natural number equal to or larger than 1), a branching rule for branching off to any one of a set of n values among the 2n values and a set of the remaining n+1 values is the branching rule to be selected, but the numbers of values in those sets may be other than the combination of n and n+1.

Subsequently, the node search module 312 sums up the base points of the branching rule in accordance with the selected branching rule (Step S334-3). For example, when E(gender) is selected in the base-point-added table 253 shown in FIG. 9, the base point of E(male) is a total sum of the base points (in the first embodiment, the number of occurrences) in the first row, the third row, the fifth row, and the seventh row of the record, that is, E(100+60+40+20)=E (220). In the same manner, the base point of E(female) is E(100+60+20+5)=E(185).

Subsequently, the node search module 312 inputs all the base points that have been summed up to the evaluation function 321 to obtain an evaluation point (Step S334-4). As the evaluation function 321 for calculating the evaluation point, the following calculation expressions are known.

Error ratio: $E(t)=1-\max\{Pr(C_i|t)\}$ (1)

Information entropy: $-\Sigma Pr(C_i|t)\log\{Pr(C_i|t)\}$ (2)

Gini coefficient: $1-\Sigma\{Pr(C_i|t)^2\}$ (3)

In the calculation expressions, Pr represents an occurrence probability, $C_i$ represents the value of a record, and t represents the number of a node. In general, in the decision tree analysis, each of those evaluation functions 321 is used to calculate the evaluation point, and the lowest evaluation point is employed as the child node. The occurrence probability is a value obtained by dividing the number of records that have occurred by the total number of records, and hence it is assumed in the first embodiment that the number of occurrences is used for the evaluation function 321 in place of the occurrence probability.

For example, in the case of an error ratio, the number of records is represented by n, and the evaluation function 321 is represented by $nE(t)=n-n\max\{Pr(C_i|t)\}$. In other words, $n\max\{Pr(C_i|t)\}$ is the number of occurrences of the node t, and hence the evaluation function 321 is represented by the number of records. For example, E(220+185)−max{E(220), E(185)}=E(405)−E(220)=E(185) is obtained as the evaluation point for the branching rule based on whether the gender is "male" or "female".

Subsequently, the node search module 312 determines whether or not all the branching rules for the selected attribute have been evaluated (Step S334-5). When determining that there is a branching rule that has not been evaluated (No in Step S334-5), the node search module 312 returns to Step S334-2. When determining that all the branching rules have been evaluated (Yes in Step S334-5), the node search module 312 determines whether or not all the attributes have been selected (Step S334-6).

When determining that there is an unselected attribute (No in Step S334-6), the node search module 312 returns to Step S334-1. When determining that all the attributes have been selected (Yes in Step S334-6), the node search module 312 obtains a minimum evaluation point (Step S334-7), and employs a branching rule having the minimum evaluation value for a branch in the decision tree (Step S334-8).

The example in which the evaluation function 321 is an error ratio has been described above, but the expression of an information entropy or a Gini coefficient may be used. In that case, the node search module 312 sets (number of occurrences)×log(number of occurrences) or the square of (number of occurrences) as the base point.

The description has been given above of processing relating to the learning phase performed until the analysis agent server 300 generates a decision tree from the encrypted table 222 for learning. The above-mentioned learning phase allows the decision tree to be created without decrypting the table 222 for learning, that is, under a state in which the table 222 for learning is kept secret to the analysis agent server 300.

Figure 14:
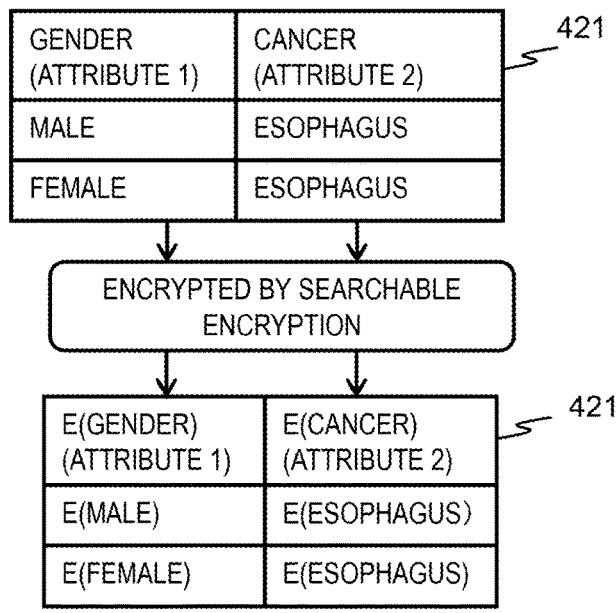
FIG. 14 is an explanatory diagram for illustrating an example of encryption processing according to the first embodiment.

Next, a description is given of processing relating to the analysis phase until the analysis phase analysis agent server 300 outputs the analysis result from the encrypted table for analysis. FIG. 14 is an explanatory diagram for illustrating an example of encryption processing for the table 421 for analysis performed in Step S410. The encryption module 212 encrypts each cell of the table 421 for analysis by searchable encryption.

Figure 15:
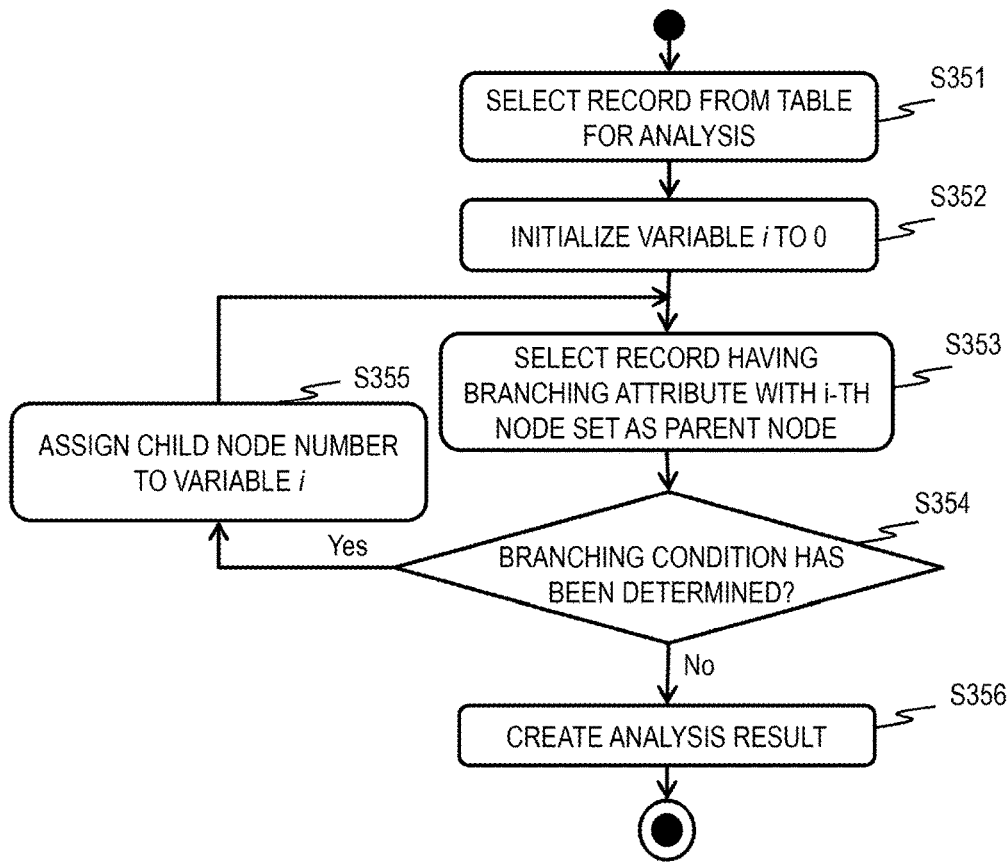
FIG. 15 is a flow chart for illustrating an example of the analysis processing according to the first embodiment.

FIG. 15 is a flow chart for illustrating an example of the analysis processing performed in Step S350. First, the decision tree analysis module 313 selects a record from the encrypted table for analysis (Step S351). In the following description, the selected record is referred to as "record for analysis".

Subsequently, the decision tree analysis module 313 initializes the variable i to 0 (Step S352). The decision tree analysis module 313 selects a record with the i-th node set as the parent node from the decision tree table, and the encryption determination module 314 selects the attribute of the record for analysis that matches the attribute of the selected record (Step S353). In the following description, the record selected from the decision tree table by the decision tree analysis module 313 is referred to as "decision tree record".

In Step S353, the encryption determination module 314 uses the determination function of the searchable encryption to determine whether or not the decision tree record and the record for analysis have the same attribute without decrypting the decision tree record and the record for analysis. The encryption determination module 314 also determines whether or not the encrypted data relating to the selected attribute of the record for analysis is the same as the encrypted data listed in the branching condition of the decision tree record (Step S354).

When determining that the same encrypted data is included in the branching condition (Yes in Step S354), the encryption determination module 314 assigns the child node number to the variable i (Step S355), and returns to Step S353. Meanwhile, when determining that the same encrypted data is not included in the branching condition (No in Step S354), the encryption determination module 314 outputs the cell of the response variable of the record with the leaf node number being the same as the variable i in the leaf node table 336 as the analysis result (Step S336).

The description has been given of the processing of Step S351 to Step S356 performed when one record is selected from the table for analysis, but the analysis agent server 300 performs those processing steps for all the records of the table for analysis in Step S350 to output the analysis results.

Figure 16A:
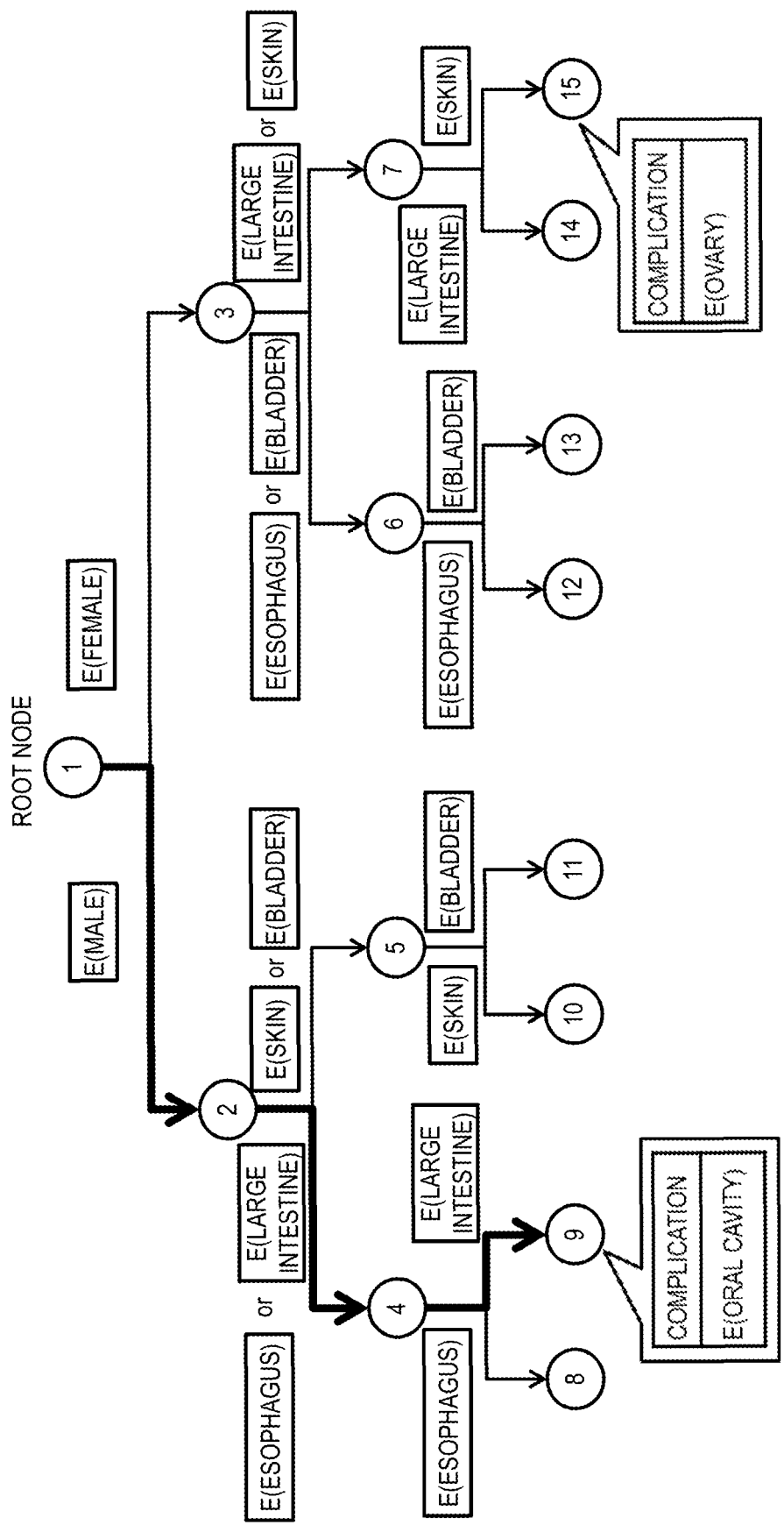
FIG. 16A is an explanatory diagram for illustrating an example of an outline of the analysis processing according to the first embodiment.
Figures 16B, 17:
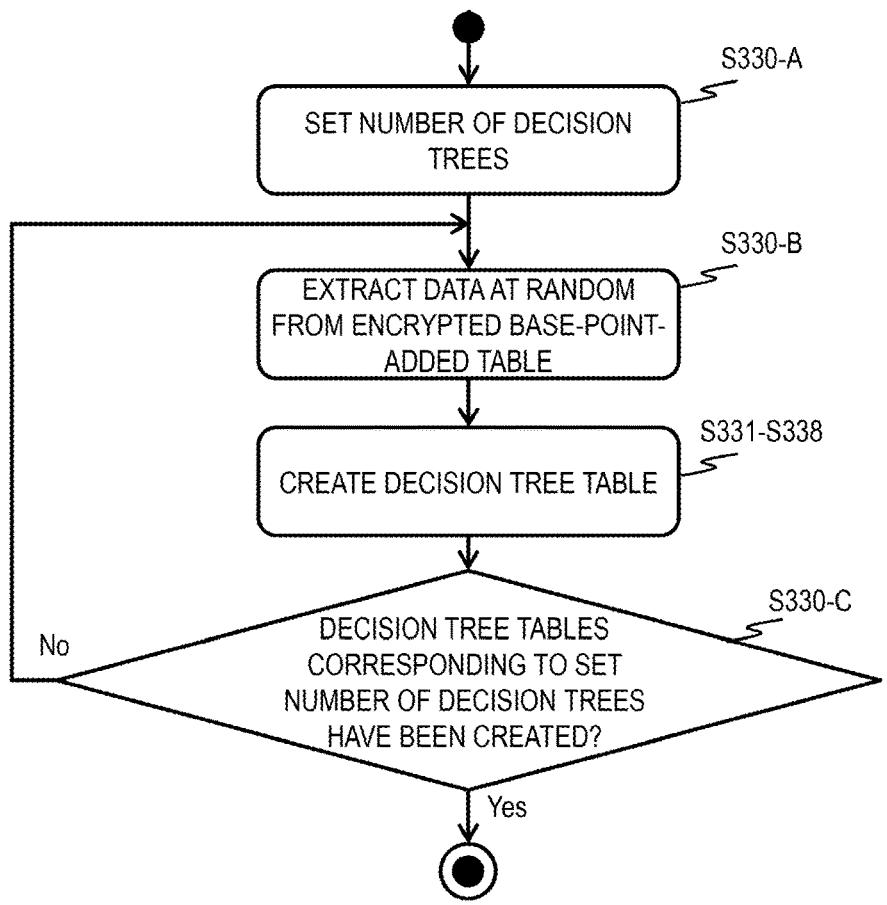
FIG. 16B is an example of a leaf node table according to the first embodiment.
FIG. 17 is a flow chart for illustrating an example of decision tree generation processing according to the second embodiment.

FIG. 16A is an explanatory diagram for illustrating an example of an outline of the analysis processing. FIG. 16A indicates an example in which the attribute E(gender) is E(male) and the attribute E(cancer) is E(large intestine). In FIG. 16B, the leaf node table 336 used for the analysis processing illustrated in FIG. 16A is shown. In the example of FIG. 16A, an analysis result indicating that the attribute value E(complication) is E(oral cavity) is returned to the delegator server 400.

As described above, the data analysis system according to the first embodiment can perform the learning (generate a decision tree) under the state in which the table 222 for learning is kept secret to the analysis agent server 300, and can also execute the decision tree analysis under a state in which the table 421 for analysis is kept secret to the analysis agent server 300.

The description of the first embodiment has been directed to the example in which the analysis agent server 300 generates a decision tree, but the provider server 200 may itself generate a decision tree and transmit the generated decision tree to the analysis agent server 300. In this case, the provider server 200 may generate a decision tree table without encrypting the base-point-added table 253. However, the provider server 200 is required to have the values encrypted in each column of the decision tree table before transmitting the decision tree table to the analysis agent server 300.

Second Embodiment

A data analysis system according to a second embodiment of this invention achieves a random forest, which is one of data analysis methods obtained by extending the decision tree analysis. The following description is given of points different from those of the first embodiment. The second embodiment is different from the first embodiment in the decision tree generation processing performed in Step S330 and the analysis processing performed in Step S350.

FIG. 17 is a flow chart for illustrating an example of the decision tree generation processing performed in Step S330. First, the decision tree generation module 311 sets the number (equal to or larger than 1) of decision trees to be generated (Step S330-A). For example, the number of decision trees to be generated may be defined in advance, or may be specified by, for example, a user of the analysis agent server 300 when the decision tree generation processing is started. The decision tree generation module 311 extracts a record at random from the encrypted base-point-added table (Step S330-B).

Figures 18, 19:
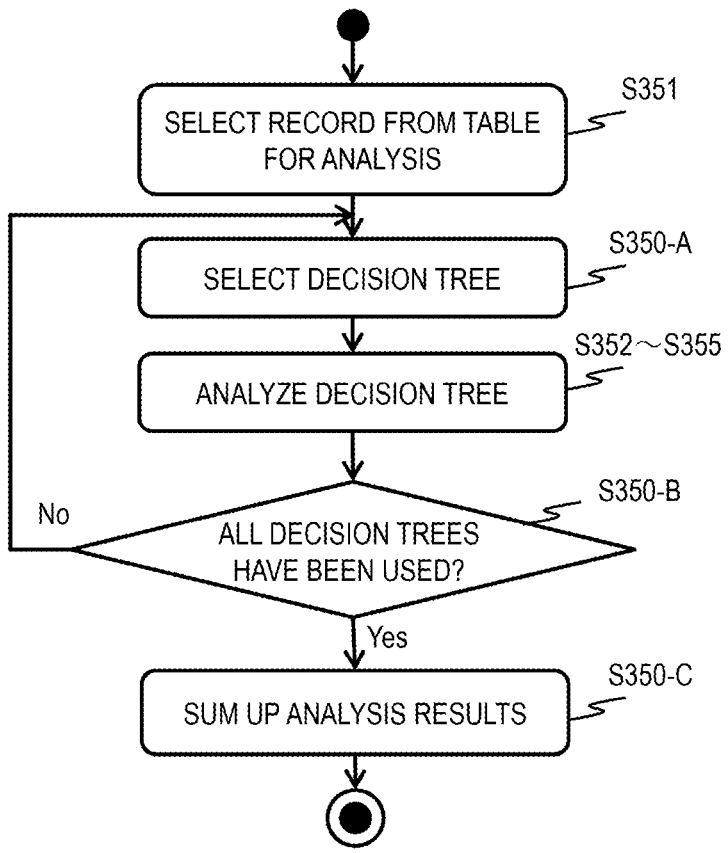
FIG. 18 is an explanatory diagram for illustrating an example of an outline of processing for extracting a record from an encrypted base-point-added table according to the second embodiment.
FIG. 19 is a flow chart for illustrating an example of analysis processing performed by using a plurality of decision tree tables according to the second embodiment.

FIG. 18 is an explanatory diagram for illustrating an example of an outline of processing for extracting a record from the encrypted base-point-added table, which is performed in Step S330-B. In the extracting processing, the decision tree generation module 311 adds a column for checking extraction to the encrypted base-point-added table, and stores "False" as the values of all the cells in the column for checking extraction.

Subsequently, the decision tree generation module 311 generates a predetermined number of different random numbers. The random number has an upper limit of the number of records of the base-point-added table and a lower limit of 1. For example, the random number is a natural number equal to or larger than 1. The predetermined number is equal to or larger than 1 and equal to or smaller than the number of records of the base-point-added table, and is desired to be equal to or larger than ½ of the number of records of the base-point-added table. Finally, the decision tree generation module 311 changes the value of the cell in the column for checking extraction of the record having the same row number as the generated random number to "True". With this configuration, it is possible to achieve the processing for extracting a record at random from the base-point-added table.

Subsequently, the decision tree generation module 311 generates a decision tree table from only the record in which the value of the cell in the column for checking extraction of the base-point-added table is "True" (Step S331 to Step S338). Step S331 to Step S338 are the same as those of the first embodiment.

The decision tree generation module 311 determines whether or not decision tree tables corresponding to the number of decision trees set in Step S330-A have been generated (Step S330-C). When determining that decision tree tables corresponding to the number of decision trees have not been generated (No in Step S330-C), the decision tree generation module 311 resets all the values in the column for checking extraction of the base-point-added table to "False", and returns to Step S330-B. When determining that decision tree tables corresponding to the number of decision trees have been generated (Yes in Step S330-C), the decision tree generation module 311 brings the decision tree generation processing to an end. As a result, a plurality of decision tree tables are generated.

In the processing of Step S330 in the second embodiment, for example, a computer including a plurality of calculation units (CPU) may generate a plurality of decision trees by parallel processing. Specifically, for example, random number generation processing is executed in parallel, and a plurality of columns for checking extraction are provided, to thereby be able to generate a plurality of decision trees by parallel processing.

FIG. 19 is a flow chart for illustrating an example of the analysis processing performed in Step S350 through use of a plurality of decision tree tables. The processing of Step S351 to Step S355 is the same as that of the first embodiment. In the second embodiment, Step S350-A, Step S350-B, and Step S350-C are added to those processing steps.

Subsequently to Step S351, the decision tree analysis module 313 selects a decision tree table to be used for the decision tree analysis performed in Step S352 to Step S355 (Step S350-A). However, the decision tree analysis module 313 is configured to select a decision tree table that has not been used for the decision tree analysis of the record for analysis selected in Step S351 so as to prevent the same decision tree table from being selected again to analyze the same record for analysis.

Subsequently, after the processing of Step S352 to Step S355 has been executed, the decision tree analysis module 313 determines whether or not all the decision tree tables have been selected for the record for analysis selected in Step S351 (Step S350-B). When determining that there is an unselected decision tree table (No in Step S350-B), the decision tree analysis module 313 returns to Step S350-A. When the decision tree analysis module 313 determines that all the decision tree tables have been selected (Yes in Step S350-B), the encryption determination module 314 sums up analysis results of analyzing the plurality of decision trees (Step S350-C).

In general, when the structure of a decision tree differs, the analysis result may differ. For example, the encryption determination module 314 calculates average values and representative values by a majority decision scheme, to thereby summing up analysis results in Step S350-C. For example, when the response variable is encrypted by deterministic encryption, which is an example of the standard encryption, the encryption determination module 314 can determine which encrypted data has a large number, that is, can employ the majority decision scheme, and can employ analysis results obtained by summing up a large number of pieces of encrypted data.

Further, for example, when a response variable is encrypted by an encryption scheme that allows calculation to be performed under a state of being encrypted by, for example, summable and comparable encryption, the encryption determination module 314 can sum up analysis results under a state that allows average values and median values to be derived, that is, can sum up analysis results based on the calculation of average values and representative values.

When, for example, a user of the delegator server 400 desires analysis results to be summed up at a high level, after the analysis agent server 300 transmits the analysis result of each decision tree to a delegator server (Step S370), the delegator server 400 may decrypt the analysis result and further calculate the analysis result in a plaintext.

The description has been given above of the processing of Step S351 to Step S350-C performed when one record is selected from the table for analysis. In Step S350, the analysis agent server 300 performs the processing for all the records of the table for analysis.

In the processing of Step S350, a computer including a plurality of calculation units (CPU) may parallelly execute the processing for selecting a decision tree and the analysis processing by parallel processing.

This invention is not limited to the above-described embodiments but includes various modifications and similar configurations in the scope of the purpose of the appended claims. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions.

The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected.

What is claimed is:

1. A data analysis server, comprising:
a processor; and
a memory,
wherein the memory is configured to hold base-point-added information generated from information for learning,
wherein the base-point-added information includes a plurality of records, in each of which a value of an explanatory variable encrypted by first high-performance encryption, a value of a response variable encrypted by a predetermined encryption scheme, and a base point based on a number of occurrences of the value of the explanatory variable in the information for learning are associated with one another,
wherein the base point held in the base-point-added information is encrypted by second high-performance encryption,
wherein the processor is configured to:
execute decision tree generation processing for generating a decision tree having a leaf node associated with the value of the response variable encrypted by the predetermined encryption scheme, which is included in the base-point-added information; and decide, in the decision tree generation processing, a branching rule based on the value of the explanatory variable in the decision tree, and wherein the processor is configured to, in the decision of the branching rule:

generate at least one branching rule candidate; and execute, without decrypting the value of the explanatory variable for the at least one branching rule candidate and the base point corresponding to the value of the explanatory variable:

processing for summing up, by referring to the base-point-added information for each of the at least one branching rule candidate, the base point corresponding to the value of the explanatory variable for the each of the at least one branching rule candidate in the base-point-added information;

processing for calculating, for each of the at least one branching rule candidate, the evaluation point for the each of the at least one branching rule candidate based on the summed base point and a predetermined evaluation function; and processing for deciding the branching rule to be employed from the at least one branching rule candidate based on the calculated evaluation point.

2. The data analysis server according to claim 1, wherein the first high-performance encryption comprises searchable encryption.

3. The data analysis server according to claim 1, wherein the second high-performance encryption comprises summable and comparable encryption.

4. The data analysis server according to claim 1, wherein the processor is configured to execute processing for generating a plurality of decision trees, and wherein the processor is configured to, in the processing for generating each of the plurality of decision trees:

extract a plurality of records from the base-point-added information; and execute the decision tree generation processing for the extracted plurality of records.

5. The data analysis server according to claim 1, wherein the memory is configured to hold information for analysis including the value of the explanatory variable encrypted by the first high-performance encryption, and wherein the processor is configured to:

execute processing for comparing the value of the explanatory variable included in the information for analysis and the branching rule in the generated decision tree to identify a leaf node corresponding to the value of the explanatory variable, without decrypting the value of the explanatory variable included in the decision tree and the value of the explanatory variable included in the information for analysis; and output the value of the response variable encrypted by the predetermined encryption scheme, the value corresponding to the identified leaf node.

6. A data analysis system, comprising:

a data provide server; and a data analysis server, wherein the data provide server is configured to:

hold information for learning including a plurality of records, in each of which a value of an explanatory variable and a value of a first response variable are associated with one another;

calculate a base point based on a number of occurrences of the value of the explanatory variable in the information for learning and a predetermined function;

create base-point-added information including a plurality of record, in each of which the value of the explanatory variable, a value of a second response variable, and the calculated base point are associated with each other, the second response variable is based on the value of the second response variable associated with the value of the explanatory variable in the information for learning;

encrypt the value of the explanatory variable in the base-point-added information by first high-performance encryption;

encrypt the value of the second response variable in the base-point-added information by predetermined encryption scheme;

encrypt the base point in the base-point-added information by second high-performance encryption; and transmit the encrypted base-point-added information to the data analysis server, and wherein the data analysis server is configured to:

execute decision tree generation processing for generating a decision tree having a leaf node associated with the value of the second response variable encrypted by the predetermined encryption scheme, which is included in the base-point-added information; and decide, in the decision tree generation processing, a branching rule based on the value of the explanatory variable in the decision tree, and wherein the processor is configured to, in the decision of the branching rule:

generate at least one branching rule candidate; and execute, without decrypting the value of the explanatory variable for the at least one branching rule candidate and the base point corresponding to the value of the explanatory variable:

processing for summing up, by referring to the base-point-added information for each of the at least one branching rule candidate, the base point corresponding to the value of the explanatory variable for the each of the at least one branching rule candidate in the base-point-added information;

processing for calculating, for each of the at least one branching rule candidate, the evaluation point for the each of the at least one branching rule candidate based on the summed base point and a predetermined evaluation function; and processing for deciding the branching rule to be employed from the at least one branching rule candidate based on the calculated evaluation point.

7. The data analysis system according to claim 6, wherein the data provide server is configured to:

create a value of the explanatory variable that is not included in the information for learning;

add, to the information for learning, an addition record in which the created value of the explanatory variable and a blank value of the first response value are associated with each other; and create the base-point-added information by using the information for learning to which the addition record is added.

8. The data analysis system according to claim 6, further comprising an analysis delegate server,
wherein the analysis delegate server is configured to:
hold information for analysis including a value of the explanatory variable;
encrypt the value of the explanatory variable in the information for analysis by the first high-performance encryption; and
transmit the encrypted information for analysis to the data analysis server,
wherein the data analysis server is configured to:
execute processing for comparing the value of the explanatory variable included in the information for analysis and the branching rule in the generated decision tree to identify a leaf node corresponding to the value of the explanatory variable, without decrypting the value of the explanatory variable included in the decision tree and the value of the explanatory variable included in the information for analysis; and
transmit, to the analysis delegate server, the value of the second response variable encrypted by the predetermined encryption scheme, the value corresponding to the identified leaf node, and
wherein the analysis delegate server decrypt the transmitted value of the second response variable that is encrypted by the predetermined encryption scheme.

9. A data analysis method by a data analysis server,
wherein the data analysis server is configured to hold base-point-added information generated from information for learning,
wherein the base-point-added information includes a plurality of records, in each of which a value of an explanatory variable encrypted by first high-performance encryption, a value of a response variable encrypted by a predetermined encryption scheme, and a base point based on a number of occurrences of the value of the explanatory variable in the information for learning are associated with one another,
wherein the base point held in the base-point-added information is encrypted by second high-performance encryption,
the data analysis method comprising:
executing, by the data analysis server, decision tree generation processing for generating a decision tree having a leaf node associated with the value of the response variable encrypted by the predetermined encryption scheme, which is included in the base-point-added information; and
deciding, by the data analysis server, in the decision tree generation processing, a branching rule based on the value of the explanatory variable in the decision tree, and
wherein the data analysis server is configured to, in the decision of the branching rule:
generate at least one branching rule candidate; and
execute, without decrypting the value of the explanatory variable for the at least one branching rule candidate and the base point corresponding to the value of the explanatory variable:
processing for summing up, by referring to the base-point-added information for each of the at least one branching rule candidate, the base point corresponding to the value of the explanatory variable for the each of the at least one branching rule candidate in the base-point-added information;
processing for calculating, for each of the at least one branching rule candidate, the evaluation point for the each of the at least one branching rule candidate based on the summed base point and a predetermined evaluation function; and
processing for deciding the branching rule to be employed from the at least one branching rule candidate based on the calculated evaluation point.

* * * * *